United States Patent [19]

Fujita

[11] Patent Number: 4,899,192

[45] Date of Patent: Feb. 6, 1990

[54] IMAGE INFORMATION APPARATUS

[75] Inventor: Yukitoshi Fujita, Nara, Japan

[73] Assignee: Sharp Kabushiki Kaisha, Osaka, Japan

[21] Appl. No.: 203,540

[22] Filed: May 26, 1988

Related U.S. Application Data

[63] Continuation of Ser. No. 13,916, Feb. 12, 1987, abandoned.

[30] Foreign Application Priority Data

Feb. 18, 1986 [JP] Japan ........................ 61-34261

[51] Int. Cl.⁴ ........................ G03B 27/48; G03B 27/50; G03B 27/70

[52] U.S. Cl. ........................ 355/51; 355/25; 355/75

[58] Field of Search ........................ 355/50, 51, 25, 75

[56] References Cited

U.S. PATENT DOCUMENTS

| | | | |
|---|---|---|---|
| 4,214,832 | 7/1980 | Kono et al. | 355/51 |
| 4,511,246 | 4/1985 | Nishiyama | 355/75 |
| 4,540,269 | 9/1985 | Nishiyama | 355/75 |
| 4,568,181 | 2/1986 | Nishiyama | 355/75 |
| 4,699,368 | 10/1987 | Hiraoka et al. | 355/75 |

*Primary Examiner*—Monroe H. Hayes

*Attorney, Agent, or Firm*—Flehr, Hohbach, Test, Albritton & Herbert

[57] ABSTRACT

An image formation apparatus is operable in two different modes. The selection of a mode is made automatically, depending on the size of the document to be scanned. If the document is bulky like a book and is placed on a document table by opening an automatic document feeder or if it is or sheet-like but long and cannot be wrapped around a document winding cylinder, the optical system is moved to scan the document. If the document is sheet-like and sufficiently short, it is wrapped around the cylinder and is scanned by a stationary optical system while the cylinder is rotated.

6 Claims, 2 Drawing Sheets

IMAGE INFORMATION APPARATUS

This is a continuation of application Ser. No. 013,916, filed Feb. 12, 1987, now abandoned.

BACKGROUND OF THE INVENTION

This invention relates to an image formation apparatus which makes use of an optical system to scan a document.

There have been image formation apparatus equipped with an automatic document feeder and capable of scanning by moving an optical system both a bulky original, such as a book, and a sheet-like document placed on a document table. When many sheet-like documents are successively scanned by such an apparatus, the documents are fed one sheet at a time from a document supplying section disposed at one end in the upper part. Since the optical system usually must start from its home position to scan each document, it must return to this home position after each scan and this results in a waste of time.

For this reason, a new type of apparatus has been considered which includes a rotary cylinder around which a document transported from the document supplying section is wrapped and rotated such that the document can be scanned by a stationary optical system. Such a cylinder, however, must have a large enough circumference in order to accommodate documents of all sizes. A bulky original such as a book, however, cannot be handled by such an apparatus depending entirely on a cylinder to feed original documents.

U.S. Pat. No. 3,833,296 issued Sept. 3, 1974 to Vola, et al. discloses a scanning system which can be operated in two modes. When a copy is made from a bulky original such as a book, it is placed on a horizontal glass plate and is scanned by a moving optical system. A smaller sheet-like original, on the other hand, can be fed through an exposure device and exposed by a stationary optical system such that copies can be made quickly. With this device, however, selection between the two modes of operation cannot be made automatically and it was up to the user to decide for each original document which of the modes to be used.

SUMMARY OF THE INVENTION

It is therefore an object of the present invention to provide a highly efficient, automated image formation apparatus which can handle not only sheet-like original documents of all sizes speedily but also bulky original documents such as books.

The above and other objects of the present invention are achieved by providing an image formation apparatus having an automatic document feeder with a document supplying section at one end in the upper part of the housing and an automatic document winding cylinder at the other end, a document size sensor being provided such that the size of a document transported from the document supplying section is detected and the mode of operation is automatically selected on the basis of the detected document size. If the document is larger than the circumference of the winding cylinder, it is transported by the automatic document feeder and the optical system is moved to scan the document. If the document is short enough to be wrapped around the cylinder, it is automatically wrapped around it and is scanned by its rotation with the optical system fixed.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION OF THE INVENTION

Figure 1A:
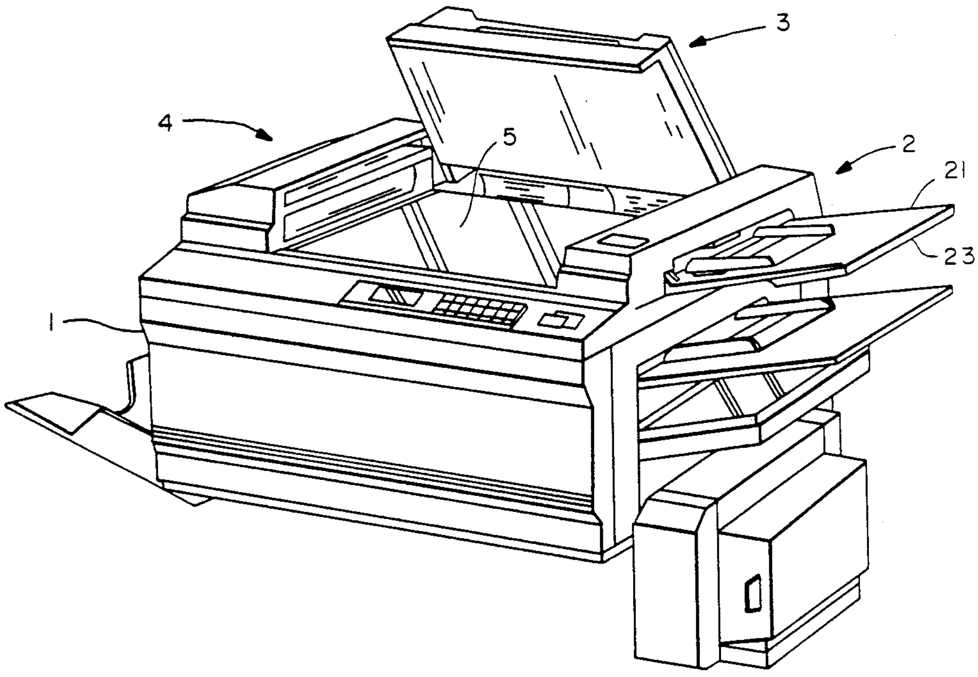
FIG. 1A is a perspective view of a copying machine embodying the present invention.
Figure 1B:
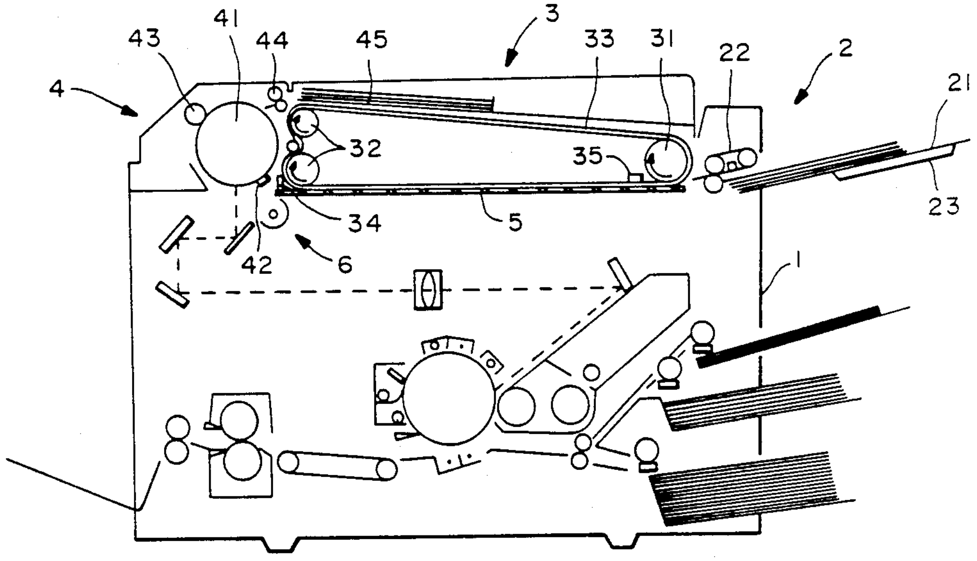
FIG. 1B is a schematic drawing showing the interior of the copying machine of FIG. 1A, and FIGS. 2A and 2B are schematic drawings showing the two modes of operation of the copying machine of FIGS. 1A and 1B.

With reference to FIG. 1A which is a perspective view of a copying machine embodying the present invention and FIG. 1B which is a schematic view of its internal structure, there is disposed in the upper part of a machine housing 1 an automatic document feeder 3 for placing at a standard center position a document transported from a document feeding section 2 on the right-hand side. In the upper part on the left-hand side, there is an automatic document winding means 4 including a cylinder 41 for wrapping a document around. The housing 1 below the automatic feeder 3 and the document winding means 4 contains an optical system 6 which either remains fixed or moves to scan an original document on the document table 5 or the surface of the aforementioned cylinder 41. The document feeding section 2 includes a document tray 21 and feeder rollers 22 which rotate to transport a document from the document tray 21. Below the document tray 21 is a document size detector 23 as disclosed, for example, in U.S. Pat. No. 3,689,143 issued Sept. 5, 1972, comprising a reflection-type photosensor for detecting the size of the document on the document tray 21.

The automatic document feeder 3 is provided with transporting rollers 31 and 32 disposed respectively on the document receiving side and on the document discharging side of the document table 5 and a conveyor belt 33 stretched between them. The transporting rollers 31 and 32 are made to turn in synchronism with respect to each other, causing the conveyor belt 33 to rotate therewith. The automatic document feeder 3 can be opened and closed around an axis in the upper back part of the housing 1. A sensor 35 is provided at the right-hand end on the document table 5 for detecting whether the automatic document feeder 3 is in the opened or closed condition. At the left-hand end of the document table 5 is a document edge detecting sensor 34 for detecting the front edge of the document transported by the conveyor belt 33.

The automatic document winding means 4 includes the aforementioned cylinder 41 for wrapping therearound a document transported by the conveyor belt 33 of the automatic document feeder 3. On the surface of the cylinder 41, there is provided a document grip 42 for gripping the front edge of a document which has been transported thereto to wrap it around on the surface of the rotating cylinder 41. Adjacent to the cylinder 41 are an auxiliary roller 43 which leads the document to be discharged by rotating in synchronism with the cylinder 41 and a pair of document discharge rollers 44 for discharging the document on the surface of the cylinder 41. The document on the surface of the cylinder 41 is removed therefrom by means of a document removing blade-like member and is passed between the document discharge rollers 44 onto a document discharge tray 45 disposed in the upper part of the automatic document feeder 3.

Figure 2A:
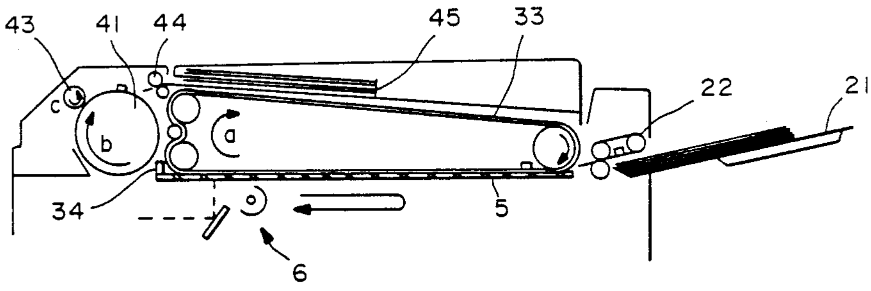

The two modes in which a copy machine structured as described above is operated are shown respectively in FIGS. 2A and 2B. With reference to FIG. 2A which shows what is hereinafter referred to as the first mode wherein a document is supplied by the automatic document feeder 3 and scanned by moving the optical system, a document on the document tray 21 is brought to the right-hand edge of the document table 5 by the rotation of the feeder rollers 22 and the document thus brought in is further moved onward by the conveyor belt 33 of the automatic document feeder 3 which rotates in the direction of the arrow a. When the document edge detecting sensor 34 detects the front edge of the document, the rotary motion of the conveyor belt 33 is stopped and the document is found in the ready position on the document table 5. With the document in this position, the optical system 6 moves to scan the document for copying operation. When the scanning of the document is completed, the conveyor belt 33 rotates in the direction of the arrow a to transport the document away. The document is transported in the direction of the document discharge rollers 44 to be discharged by the rotation of the cylinder 41 in the direction of the arrow b and of the auxiliary roller 43 in the direction of the arrow c.

The document removing member disposed above the cylinder 41 serves to separate the document from the surface of the cylinder 41 and the document is thereafter discharged into the document discharge tray 45 with the help of the document discharge rollers 44.

Figure 2B:
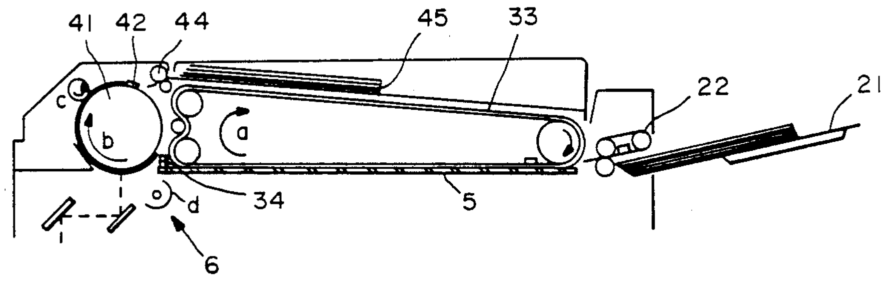

With reference next to FIG. 2B which shows what is hereinafter referred to as the second mode wherein a document is supplied to the automatic document winding means 4 and scanned by rotating the cylinder 41 with the optical system fixed, a document on the document tray 21 is brought to the left-hand edge of the document table 5 by the rotation of the feeder rollers 22 and the document thus brought in is further moved onward by the conveyor belt 33 of the automatic document feeder 3 which rotates in the direction of the arrow a. When the document edge detecting sensor 34 detects the front edge of the document, the rotary motion of the conveyor belt 33 is stopped. The cylinder 41 rotates in the direction of the arrow b and the document grip 42 on the surface of the cylinder 41 grips the front edge of the document to wrap it around the surface of the cylinder 41. As the cylinder 41 rotates with the document thus wrapped therearound, the optical system which is fixed at its home position d scans the document. Since the front edge of the document during this scanning process is at the same position as the document grip 42, the position of the document is easily ascertained by knowing the rotary motion of the cylinder. After the scanning is completed, the document is separated from the surface of the cylinder 41 with the help of the document removing member and discharged into the document discharge tray 45 by the document discharge rollers 44.

The user can selectively use these two modes of operation, depending on the type and size of the original document to be copied. When the automatic document feeder 3 is opened and closed, it is detected by the automatic document feeder sensor 35 and the document is scanned in the first mode. When a bulky original such as a bound book is placed on the document table 5 by initially operating the automatic document feeder 3, for example, the subsequent scanning operation is done in the first mode. If documents are placed on the document tray 21 without opening or closing the automatic document feeder 3, the document size detector 23 detects the document size, and the second mode is selected if it is found that the document size is such that the document can be wrapped around the cylinder 41 of the automatic document winding means 4 (that is, it is shorter than the circumference of the cylinder 41). In other words, the automatic document feeder 3 transports the document to the automatic document winding means 4 and serves to have it wrapped around the cylinder 41, and the scanning is effected thereafter with the optical system 6 fixed at its home position d. If the document size detector 23 concludes that the document size is such that the document cannot be wrapped around the cylinder 41, the first mode is selected. In other words, the automatic document feeder 3 transports the document to the document table 5 and the optical system 6 is moved for scanning the document.

In summary, the present invention provides an improved image formation apparatus with which not only can bulky originals such as books and very large documents be scanned but also documents of smaller sizes can be scanned speedily by means of an automatic document winding means such that the average copying speed can be increased.

What is claimed is:

1. An image formation apparatus comprising a housing, an optical system, an automatic document feeder with a document supplying section at one end in the upper part of said housing, an automatic document winding device at the other end of said housing with a drum for wrapping a document therearound, a document size sensor for detecting the size of a document supplied from said document supplying section relative to the size of said drum, and selecting means capable of automatically selecting on the basis of document size detected by said document size sensor between a first mode of operation wherein a document is transported by said automatic document feeder and said optical system is moved to scan said document and a second mode of operation wherein a document is transported by said automatic document winding device and wherein said optical system remains fixed and said drum is rotated to scan said document.

2. The image formation apparatus of claim 1 wherein said automatic document feeder is openable with respect to said housing and said image formation apparatus further comprises an open-close sensor for detecting whether said automatic document feeder is opened.

3. The image formation apparatus of claim 2 wherein said selecting means are adapted to select said first mode of operation if said open-close sensor detects that said automatic document feeder has been opened.

4. The image formation apparatus of claim 2 wherein said selecting means are adapted to select said first mode of operation if said open-close sensor detects that said automatic document feeder has not been opened and said document size sensor detects the document size to be greater than the circumference of said drum.

5. The image formation apparatus of claim 2 wherein said selecting means are adapted to select said second mode of operation if said open-close sensor detects that said automatic document feeder has not been opened and said document size sensor detects that document size to be smaller than the circumference of said drum.

6. The image formation apparatus of claim 1 wherein said document size sensor serves to determine whether said document supplied from said document supplying section can be wrapped around said drum without overlapping itself.

* * * * *